May 29, 1956 J. G. JERGENS 2,747,948
PILOT BEARING
Filed Nov. 12, 1954
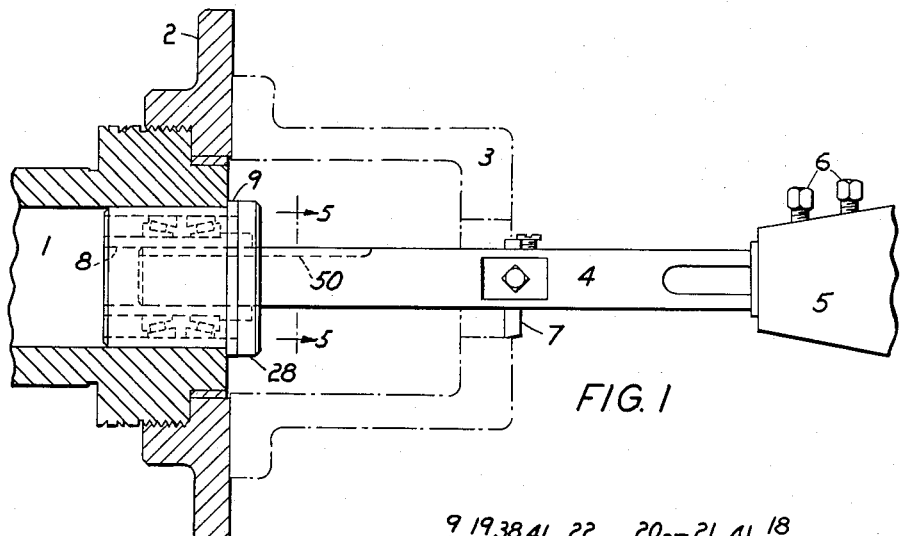
FIG. 1
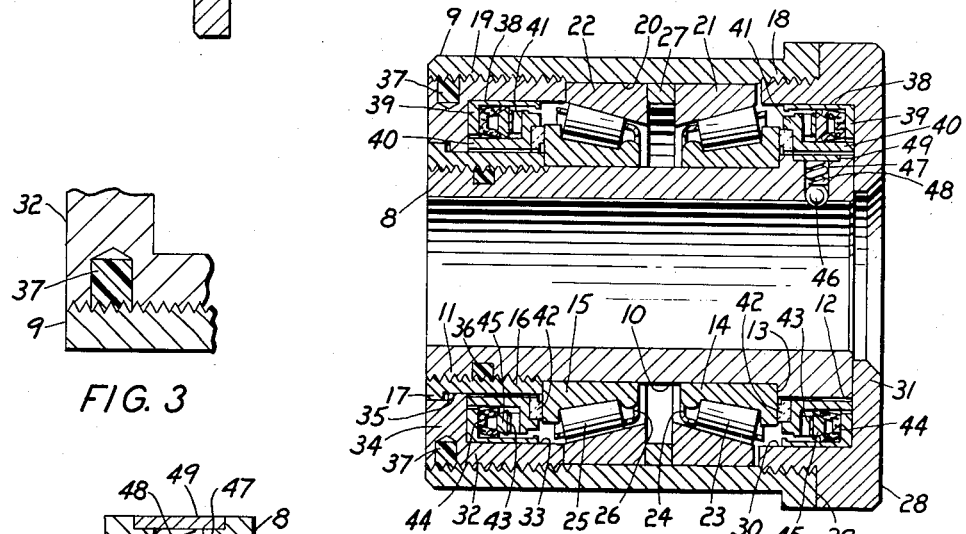
FIG. 2
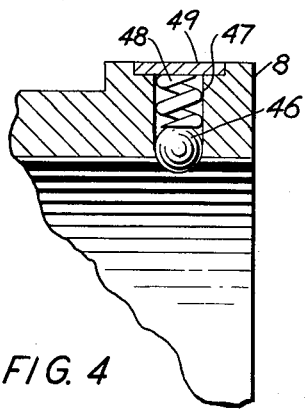
FIG. 3
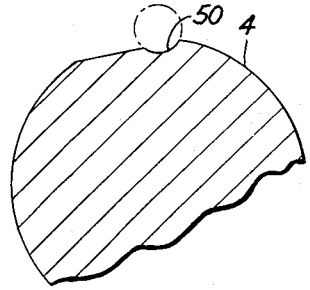
FIG. 4
FIG. 5
INVENTOR.
JOHN G. JERGENS
BY Evans & McCoy
attorneys

United States Patent Office 2,747,948
Patented May 29, 1956

2,747,948
PILOT BEARING

John G. Jergens, Shaker Heights, Ohio

Application November 12, 1954, Serial No. 468,233

5 Claims. (Cl. 308—187.1)

This invention relates to pilot bushings which provide a guide and bearing between elements having relative rotary and axial movements, such as for example between the rotating and non-rotating spindles of a lathe, or between a fixture and an axially movable shaft such as a drill spindle.

The bearing of the present invention has inner and outer concentric sleeves that provide an annular space between them in which oppositely inclined tapered roller bearings are mounted. The ends of the bearing chambers are closed by flanges that are carried by the outer sleeve and that project inwardly therefrom at the ends of the bearing, the inner edge portions of the closure flanges having close running clearance with respect to the inner sleeve. Sealing assemblies are provided at each end of the bearing between the inner and outer sleeves and these sealing assemblies are carried by the outer sleeve and are provided with sealing rings that engage with the race rings that are secured to the inner sleeve. The sealing rings engage the roller race rings radially outwardly of the inner edges of the closure flanges, so that centrifugal force acting on the lubricant in the bearing chamber tends to resist leakage of lubricant inwardly past the sealing rings.

The sealing assemblies at opposite ends of the bearing are carried by independently detachable parts of the outer sleeve of the bearing so that they can be independently removed and replaced without disturbing the roller bearings. Screw threaded clamping collars for adjusting the inner and outer race rings of the roller bearings are mounted one within the other at one end of the bearing, the inner clamping collar being screwed on the inner sleeve and the outer clamping collar having screw threaded engagement with the interior of the outer sleeve. The outer clamping collar carries a closure flange the interior edge of which closely overlies the inner clamping collar. The outer clamping collar carries one of the sealing assemblies and the other sealing assembly is carried by a closure collar at the opposite end of the bearing which is also screwed into the outer bearing sleeve.

The inner sleeve of the bearing serves as a guide for the spindle on which it has a sliding fit. If the sleeve and spindle are accurately machined to provide a close sliding fit the friction between the interior surface of the sleeve and the spindle may be sufficient to hold the sleeve against rotation with respect to the spindle that slides within it. However, since the fit of the spindle in the sleeve may not always be close enough to insure the frictional driving action, the present invention provides means that prevents relative rotation between the inner sleeve of the bearing and a spindle on which it is slidably mounted but which does not interfere with the free entry of a spindle into the sleeve. To this end, the inner sleeve is provided with a radially movable spring actuated detent that normally projects past the interior face of the sleeve, but which is retractable into the recess when engaged by the end of a spindle. The detent is preferably in the form of a ball that is normally held by a spring in a position in which it projects into the interior of the sleeve, but which will be forced into the recess when engaged by the end of a spindle as it is inserted into the sleeve. After the spindle is inserted into the sleeve relative rotation of the spindle and sleeve will cause the detent to be brought into registry with a longitudinal groove in the spindle to hold the spindle and sleeve against relative rotation.

Objects of the invention are to provide a pilot bushing having oppositely tapering roller bearings and provided with independently removable lubricant seals that engage with the inner race rings of the roller bearings, to provide a bearing in which the sealing rings are so placed that centrifugal force resists leakage past the sealing rings, to provide independently adjustable clamping collars for the inner and outer race rings of the bearing by means of which the race rings may be adjusted to take up play between the rollers and race rings, and to provide means for preventing relative rotation between the inner sleeve and a shaft or spindle having sliding engagement with the inner sleeve.

Reference should be had to the accompanying drawings forming a part of this specification, in which:

Figure 1 is a view partly in side elevation and partly in section showing the pilot bushing of the present invention mounted on a rotary lathe spindle and slidably engaging a stationary spindle;

Fig. 2 is an axial section through the bushing shown in Fig. 1, on a scale larger than that of Fig. 1;

Fig. 3 is a fragmentary section on a scale larger than that shown in Fig. 2, showing one of the locking plugs for a threaded clamping collar;

Fig. 4 is a fragmentary section on a scale larger than Fig. 2, showing the driving detent, and Fig. 5 is a fragmentary section on an enlarged scale, taken on the line 5—5 in Fig. 1.

In the accompanying drawings the pilot bushing of the present invention is shown mounted in an end of a tubular lathe spindle 1 which carries an annular work holder 2 to which a hollow work piece 3 may be secured. A stationary spindle 4 fixed to a tailstock 5 by suitable means such as screws 6, extends into the hollow spindle 1 and carries a cutting tool 7 which is adapted to engage the interior of the workpiece 3 as the workpiece is rotated with the spindle 1 and advanced axially. The bearing of the present invention has an inner internally cylindrical sleeve 8 within which the spindle 4 has a sliding fit and an outer sleeve 9 that fits within the tubular spindle 1. The inner sleeve 8 has a cylindrical external face 10 and an externally threaded end portion 11. The opposite end of the sleeve 8 is thickened to provide an externally cylindrical end portion 12 of slightly greater diameter than the cylindrical face 10, an external shoulder 13 being provided at the inner end of the portion 12. A tapered race ring 14 fits on the cylindrical portion 10 with its large end in engagement with the shoulder 13. A second oppositely tapered inner race ring 15 fits on the cylindrical portion 10 of the sleeve 8 and is spaced axially with respect to the ring 14. An elongated clamping collar 16 is screwed onto the threaded end 11 of the sleeve 8. The clamping collar 16 is of less radial thickness than the large end of the race ring 15 and is externally cylindrical. At its outer end the collar 16 has a short external circumferential flange 17. The two race rings 14 and 15 are retained on the inner sleeve between a shoulder 13 and the clamping collar 16 and rotate with the inner sleeve 8.

The outer sleeve 9 has internally threaded end portions 18 and 19 and is provided with a cylindrical interior face 20 between the threaded portions 18 and 19. A tapered race ring or bearing cup 21 fits within the cylindrical portion 20 of the outer sleeve and surrounds the inner race ring 14. An oppositely tapered race ring or bearing cup 22 surrounds the inner race ring 15, the race rings 21 and 22 tapering toward the ends of the bearing. The tapered rollers 23 held in a suitable cage 24 are interposed between the race rings 14 and 21. Tapered rollers 25 held in a suitable cage 26 are interposed between the inner and outer race rings 15 and 21. The axes of the rollers 23 and 25 are oppositely inclined and are held in proper position with respect to the race rings by adjustment of the race rings with respect to the inner and outer sleeves.

The outer race rings 21 and 22 are maintained in proper spaced relation by an intermediate spacing ring 27 that fits within the sleeve 9. The outer race ring 21 is positioned adjacent a retaining collar 28 that is externally threaded and screwed into the threaded portion 18 of the outer sleeve 9. The retaining collar 28 has an external shoulder 29 that engages with the adjacent end of the sleeve 9 and has a cylindrical internal face 30 which surrounds the end portion 12 of the inner sleeve radially outwardly thereof. The collar 28 has a closure flange 31 that extends inwardly and closely overlies the end edge of the inner sleeve 8. At its opposite end the outer sleeve 9 has a clamping collar 32 that is screwed into the threaded end portion 19 and that engages the outer end of the race ring 22. The clamping collar 32 has a cylindrical interior face 33 that surrounds and is spaced radially from the cylindrical external face of the clamping collar 16. At the outer end the clamping collar has an inwardly extending closure flange 34, the interior edge of which closely overlies the clamping collar 16, the interior edge of the flange 34 being provided with a recess 35 to receive the flange 17 of the clamping collar 16.

The clamping collars 16 and 32 are independently adjustable to clamp the roller bearings and adjust the race rings to take up play between the race rings and rollers. The outer clamping collar 32 exerts an axial thrust on the race rings 21 and 22 to force them toward the retaining collar 28 and the inclined inner face of the clamping ring 21, acting through the tapered roller 23, presses the inner race ring 14 against the shoulder 13. The inner clamping collar 16 exerts an axial thrust on the inner race ring 15 to take up play between the rollers 25 and the race rings 15 and 22. By properly adjusting the clamping collars 16 and 32, the roller bearings may be clamped in place to hold the bearings with the race rings properly adjusted with respect to the rollers so that axial play between the bearing members is eliminated.

In order to securely lock the clamping collars in adjusted positions, plastic plugs 36 and 37 are provided, the plugs 36 being mounted in recesses in the inner sleeve 8 and the plugs 37 being mounted in recesses in the clamping collar 32. These locking plugs normally project past the bottoms of the screw threads so that the screw threads will be formed in the plastic plugs when the clamping collars are screwed into place. The plugs 37 provide frictional locks for the threaded clamping collars to hold them securely in adjusted positions. The plugs 36 and 37 are preferably made of the plastic which is sold under the trade name "Nylon."

Two identical sealing assemblies are mounted between the roller bearings and the end closure flanges 31 and 34, one of the assemblies being mounted between the cylindrical interior face 30 of the retaining collar 28 and the cylindrical exterior of the end portion 12 of the sleeve 8, and the other portion is mounted between the cylindrical face 33 of the clamping collar 32 and the cylindrical exterior face of the clamping collar 16. Each of the annular sealing assemblies has an outer tubular member 38 that is of a size to fit either within the cylindrical interior face 30 of the collar 28 or the cylindrical interior face 33 of the clamping collar 32. The outer member 38 has an end flange 39 that engages the closure flange 31 or 34.

Each of the sealing assemblies has an inner tubular member 40 that is mounted within the tubular member 38 and that is movable axially with respect to the outer member 38. The inner tubular member 40 has an outwardly projecting flange 41 at its inner end upon which is mounted a carbon ring 42 that bears against the adjacent face of an inner race ring. An annular fluted spring 43 is provided for exerting an axial thrust on the inner tubular member 40 to press the carbon ring 42 against the race ring. The carbon ring 42 prevents leakage of lubricant inwardly from the bearing toward the inner sleeve 8 and, since both carbon rings engage the race rings 14 and 15 radially outwardly of the interior edges of the closure flanges 31 and 34, the centrifugal force acting on the lubricant in the bearing chamber when the outer sleeve is rotated resists the inward flow past the carbon rings 42. Means is also provided for sealing the space between the inner and outer tubular members 40 and 38 and this sealing means is in the form of a U-shaped packing ring 44 that bottoms against the flange 39 and that has side flanges extending axially and contacting the interior faces of the members 38 and 40. A wedge-shaped ring 45 is interposed between the fluted annular spring 43 and the packing ring 44 to maintain sealing engagement between the flanges of the packing ring 44 and the tubular members 38 and 40.

Since one of the assemblies is mounted in the retaining collar 28 and the other is mounted in the clamping collar 32, either of the sealing assemblies may be removed and replaced without disturbing the roller bearings. Also, the clamping collars 16 and 32 can be adjusted to take up play in the roller bearings without disturbing the sealing devices.

Relative turning movement between the guiding sleeve and spindle is undesirable since it may cause wear on the sleeve and spindle due to the presence of abrasive particles which may accumulate on the spindle and be carried into the sleeve, or which may be deposited on the interior of a sleeve. For this reason the bearing of the present invention is provided with means for positively holding the inner sleeve of the pilot bearing against rotation with respect to a spindle that slidably fits within the sleeve.

A suitable detent, preferably in the form of a ball 46, is mounted in a radial bore 47 in the end portion 12 of the inner sleeve 8 and this ball is normally held by a spring 48 in a position in which it partially projects past the interior surface of the sleeve 8, the inner end of the bore 47 being slightly restricted to prevent the ball from dropping out of the bore. The spring 48 is interposed between the ball 46 and a closure plate 49 and is sufficiently yieldable to permit the ball 46 to move to a position entirely within the bore 47 so that a spindle such as the spindle 4 may be freely inserted into the inner sleeve 8, forcing the ball 46 radially outwardly into the bore 47. When rotation is started, the sleeve 8 will turn on the spindle 4 and cause the ball 46 to engage in a longitudinal groove 50 in the spindle, after which the sleeve 8 is positively held against turning movement with respect to the spindle.

It is to be understood that in accordance with the provisions of the patent statutes, variations and modifications of the specific devices herein shown and described may be made without departing from the spirit of the invention.

What I claim is:

1. A pilot bearing comprising two relatively rotatable concentric sleeves forming an annular chamber between them, the outer of said sleeves having tubular collars screwed into its opposite ends, each collar having an inwardly projecting closure flange at its outer end, said inner sleeve having a tubular clamping collar screwed into one end thereof and a portion of enlarged diameter at its opposite end that provides a circumferential shoulder, a roller bearing comprising outer oppositely tapered race rings fitting in said outer sleeve between the inner ends of said flanged collars, inner race rings within said outer race rings and fitting on said inner sleeve between said clamping collar and said shoulder and tapered rollers between the inner and outer race rings, an annular sealing assembly mounted in each of said flanged collars and including a sealing ring engaging an end face of an inner race ring radially outwardly of the interior edges of said closure flanges.

2. A pilot bearing comprising two relatively rotatable concentric sleeves forming an annular chamber between them, the outer of said sleeves having an inwardly projecting closure flange at one end of the bearing, said inner and outer sleeves having external and internal screw threads, respectively, at the other end of the bearing and positioning shoulders in said chamber spaced inwardly from said closure flange, oppositely inclined tapered roller bearings in said annular space comprising inner and outer tapered race rings and interposed tapered rollers, the inner race rings being slidable on the inner sleeve and the outer race rings being slidable in the outer sleeve, means for adjustably clamping said roller bearings comprising inner and outer independently adjustable clamping collars screwed, one on the threaded end portion of said inner sleeve and the other in the threaded end portion of the outer sleeve and engaging the inner and outer race rings adjacent thereto, the outer of said clamping collars having an inwardly projecting closure flange that closely overlies said inner clamping collar, and annular sealing assemblies in said chamber between said closure flanges and said roller bearings that are rotatable with said outer sleeve and that have parts preventing flow of lubricant between them and said outer sleeve, each of said assemblies having a sealing ring engaging with the adjacent end face of an inner sealing ring radially outwardly of the interior edges of said closure flanges to prevent flow of lubricant between said assembly and said inner sleeve.

3. A pilot bearing comprising two relatively rotatable concentric sleeves forming an annular chamber between them, the outer of said sleeves having an inwardly projecting closure flange at one end that has an inner face that closely overlies the end edge of said inner closure member, the opposed faces of said sleeves having screw threads at the opposite end of the bearing, said inner sleeve having a portion of increased external diameter adjacent said closure flange and an external shoulder at the inner end of said portion, said outer sleeve having a portion of decreased internal diameter adjacent said closure flange and an internal shoulder at the inner end of said portion of decreased diameter, inner and outer independently adjustable clamping collars having threaded engagement with said screw threads, the outer of said collars having an inwardly projecting closure flange having an interior face that closely overlies the exterior face of the inner collar, the opposed faces of said flange and inner collar being stepped, oppositely inclined tapered roller bearings in said chamber and clamped between said collars and said shoulders, said roller bearings having inner race rings slidable in said inner sleeve and outer race rings slidable in said outer sleeve, and annular sealing assemblies in said chamber between said closure flanges and said roller bearings that are rotatable with said outer sleeve and that have parts preventing flow of lubricant between them and the outer sleeve, each of said assemblies having an axially movable carbon sealing ring and means for resiliently pressing it against the end face of an adjacent inner race ring, said sealing ring engaging the race ring radially outwardly of the interior edges of said closure flanges.

4. A pilot bearing for a rotatable axially movable spindle having two relatively rotatable concentric sleeves forming an annular chamber between them and antifriction bearings in said chamber, the inner of said sleeves being a rotatable spindle guiding sleeve having a recess opening to the interior thereof, a driving detent mounted in said recess for movement from a driving position in which it projects past the interior face of said inner sleeve to a retracted position entirely within said recess, and resilient means pressing said detent radially inwardly, said resilient means being yieldable to permit said detent to be retracted entirely into said recess by a spindle entered axially into said inner sleeve.

5. A pilot bearing for a rotatable axially movable spindle having two relatively rotatable concentric sleeves forming an annular chamber between them and antifriction bearings in said chamber, the inner of said sleeves being a rotatable spindle guiding sleeve having a recess with a restricted opening to the interior thereof, a driving detent in the form of a ball mounted in said recess for movement from driving position in which it projects partially through said restricted opening to a retracted position entirely within the recess, and a spring normally holding said detent in driving position, said spring being yieldable to permit the detent to be pressed entirely into said recess by a spindle entered axially into said sleeves.

References Cited in the file of this patent

UNITED STATES PATENTS

| | | |
|---|---|---|
| 179,381 | Wilbraham | June 27, 1876 |
| 1,498,171 | Kaps | June 17, 1924 |
| 1,526,565 | Redmond | Feb. 17, 1925 |
| 2,267,994 | Reynolds | Dec. 30, 1941 |
| 2,429,516 | Jergens | Oct. 31, 1947 |